US005517189A

United States Patent [19]

Bachhuber et al.

[11] Patent Number: 5,517,189

[45] Date of Patent: May 14, 1996

[54] CLOSURE SYSTEM WITH ADJUSTABLE SENSITIVITY

[75] Inventors: Anton Bachhuber, Langquaid; Christian Schneider, Regensburg, both of Germany

[73] Assignee: Siemens Aktiengesellschaft, Munich, Germany

[21] Appl. No.: 332,427

[22] Filed: Oct. 31, 1994

Related U.S. Application Data

[63] Continuation of Ser. No. 941,144, filed as PCT/DE91/00395, May 14, 1991, abandoned.

[30] Foreign Application Priority Data

| | | | |
|---|---|---|---|
| Dec. 21, 1990 | [EP] | European Pat. Off. | 90125290 |
| Mar. 7, 1991 | [DE] | Germany | 9102747 U |

[51] Int. Cl.$^6$ .......... H04Q 1/00

[52] U.S. Cl. .......... 340/825.69; 340/825.31; 375/345; 455/52.3

[58] Field of Search .......... 340/825.31, 825.54, 340/825.56, 825.64, 825.72; 455/52.3, 69, 70, 78, 92; 375/98, 345

[56] References Cited

U.S. PATENT DOCUMENTS

| | | | |
|---|---|---|---|
| 3,725,939 | 4/1973 | Saltzstein | 340/825.31 |
| 3,953,769 | 4/1976 | Sopko | 340/825.31 |
| 4,512,033 | 4/1985 | Schrock | 340/825.54 |
| 4,613,990 | 9/1986 | Halpern | 455/69 |
| 4,619,002 | 10/1986 | Thro | 375/98 |
| 4,713,808 | 12/1987 | Gaskill et al. | 370/94.1 |
| 4,760,393 | 7/1988 | March | 340/825.31 |
| 4,763,121 | 8/1988 | Tomoda et al. | 340/825.69 |
| 4,777,653 | 10/1988 | Bonnerot et al. | 455/69 |
| 4,783,658 | 11/1988 | Nakano et al. | |
| 4,788,542 | 11/1988 | Tanabe | 340/825.69 |
| 4,849,749 | 7/1989 | Fukamachi | 340/825.56 |
| 4,853,972 | 8/1989 | Ueda et al. | 455/78 |
| 4,868,885 | 9/1989 | Perry | 455/52.3 |
| 4,918,431 | 4/1990 | Borras | 455/92 |

FOREIGN PATENT DOCUMENTS

| | | |
|---|---|---|
| 3341900 | 5/1985 | Germany . |
| 3806130 | 5/1989 | Germany . |
| 9004042 | 8/1990 | Germany . |

*Primary Examiner*—Brian Zimmerman
*Attorney, Agent, or Firm*—Hill, Steadman & Simpson

[57] ABSTRACT

Closure system remotely controllable by transmitter signals (I) for one or more locks (L) of one or more openings (T), having a portable transmitter (S) as key (S) for radiating the transmitter signals (I), namely the UNLOCK transmitter signals (I) which (I) initiate the unlocking (Z) of the relevant lock or locks (L), and/or the LOCK transmitter signals (I) which initiate the locking (Z) of these locks (L), having a receiver (E) which (E), if it is within range (W) of the transmitter (S), triggers a control signal (Z) after the reception of the transmitter signals (I), and having a locking element (B) which can be controlled by the control signal (Z), by means of which (B) the relevant lock (L) can be locked and/or unlocked. The receiver (E) monitors a parameter of at least individual ones of the received transmitter signals (I), such as their (I) power or field strength, and adjusts—at least from time to time—the range (W), namely the sensitivity of the receiver (E) and/or the transmitting power of the transmitter (S) in accordance with the parameter monitored.

16 Claims, 1 Drawing Sheet

CLOSURE SYSTEM WITH ADJUSTABLE SENSITIVITY

This is a continuation of application Ser. No. 941,144, filed as PCT/DE91/00395, May 14, 1991, now abandoned.

BACKGROUND OF THE INVENTION

The invention is based on a closure system that is remotely controllable by transmitter signals for one or more locks of one or more openings, which can represent, for example a central locking system for the door locks and for the trunk lock of a motor vehicle and which is known per se to the expert from a high number of printed documents and prior uses.

A major problem in such methods is to avoid excessive ranges of the transmitter which facilitate thefts and occasionally also to avoid inferior ranges which make remote control more difficult or impossible. The invention relates to this major problem, namely the reliable automatic adaptive adjustment of such a range which makes thefts or burglaries more difficult and/or ensures comfortable remote control of lockable locks.

A remote controllable closure system, the receiver of which exhibits two different sensitivities, is known from DE-U 90 04 042. The first, high sensitivity is intended for continuous operation whereas the second, low sensitivity is intended for initialization or reinitialization of the system.

Furthermore, a remotely controllable closure system with variable transmitting power of the transmitter is known from DE-A1 33 41 900. In order to make it more difficult for an unauthorized person to record the transmitted code, the power is first low at the beginning of operation of the transmitter and is gradually increased with the corresponding length of operation. In this manner, the power is in each case gradually increased up to the value which is just adequate for enabling the closure system to operate.

SUMMARY OF THE INVENTION

The invention was in fact first developed for the special unidirectional motor vehicle closure system, described in WO 90/14 484, (corresponding to U.S. Ser. No. 773,635 filed on Nov. 8, 1991) when this uses transmitter signals transmitted by radio. The invention is, indeed, very suitable for this purpose. However, it was found that, in principle, the invention can also be used in many other closure systems:

Thus, the transmitter signals can be transmitted not only by radio, for example in the kHz to GHz range, but also optically, for example in the infrared range.

A preferred example in which the invention can be used in fact represents a motor vehicle closure system, namely a remote controllable motor vehicle central locking system, in which the transmitter signals radiated are received by the receiver, mounted hidden, for example in the passenger space of the motor vehicle. The closure system according to the invention can also be used for other objects, also for different types of vehicles and, for example, also for buildings and garage gates.

In addition, the transmitter can, but does not need to, radiate transmitter signals which are digitally coded in an interference-proof manner instead of transmitter signals which are coded by analog means, as soon as the user operates the transmitter, namely, for example, an operating button of the transmitter, for opening and possibly also for closing the covering (doors, boot and so forth) of the opening. The receiver compares the received code with digits previously stored in the receiver, that is to say, for example, with bits previously stored in a binary memory of the receiver, before it operates the locking systems of the locks concerned.

If the invention uses a digital code, any code can be used for the transmitter signals. It can therefore be a fixed code which always remains unchanged from operation to operation. However, it can also be an alternating code which makes theft or burglary particularly difficult in that the code is changed in accordance with certain rules or algorithms individually allocated to the relevant closure system from operation to operation. Actually, however, the transmitter signals do not need to represent any code in the invention; they can even represent, for example, a single pulse of more or less long duration.

Depending on how the receiver and the locking elements of the relevant locks are designed, the receiver can in each case optionally unlock and lock or only unlock or only lock the relevant lock—or jointly the relevant locks. Perhaps the receiver can remotely control not only the locking system but additionally even open and/or close the coverings (doors, lids and so forth) of the relevant openings in that the receiver controls, in a corresponding time-staggered manner, both the locking elements and an auxiliary motor which moves the relevant coverings.

The invention can also be both a so-called bidirectional closure system in which a dialog occurs between the transmitter and the receiver as soon as a user operates the transmitter. But it can also be a more or less strictly unidirectional closure system in which there is no dialog between the transmitter and the receiver and the reliable automatic adaptive adjustment of the range appears to be particularly difficult, namely, for example, the unidirectional motor vehicle closure system described in WO 90/14 484.

According to the invention, the object of preventing an unintended remote-controlled unlocking of the relevant locks leading to a continuous retention of the UNLOCKED state of the relevant locks because of the range being too great—for example by accidentally pressing an operating button of the transmitter which, in turn, is still accidentally within range of the receiver, as a result of which anybody could then intrude into the motor vehicle, and of preventing the lock or the locks from no longer being able to be comfortably and reliably unlocked and/or locked from the usual distance because of the range being too short, namely of being able to avoid automatically and adaptively the excessive and inferior ranges between the transmitter and the receiver which may vary even greatly with time, and indeed independently of the tolerances, temperatures and ageing effects of the components of the closure system, if possible, and independently of the state of charge of any battery mounted in the transmitter and also of the respective climate, if possible, without having to bother the user of the key for continuous readjustment of the range and without making the operation of the closure system more difficult for him, and without needing too much additional constructional expenditure for the transmitter and the receiver, is solved by the closure system defined as follows The closure system of the present invention, remotely controllable by transmitter signals, for one or more locks of one or more openings, has the following elements. A portable transmitter as a key for radiating the transmitter signals, namely at least the UNLOCK transmitter signals which initiate the unlocking of the relevant lock or locks and/or the LOCK transmitter signals which initiate the locking of these locks. A receiver, if it is within range of the transmitter, triggers a control signal after the reception of the transmitter signals. A locking element can be controlled by the control signal and by means of which the relevant lock can be locked and/or unlocked. The receiver monitors a parameter of at least individual ones of the received transmitter signals, namely their power or field strength, and the receiver adjusts, at least from time to time, the range, namely the sensitivity of the receiver and/or the transmitting power of the transmitter, in accordance with the power or field strength determined.

The following are further developments of the present invention.

The transmitter signals have radio frequencies. This allows the abovementioned advantages according to the invention also to be achieved when transmitter signals are used which allow the locking per se not only with a direct line of sight between the transmitter and the receiver but also without a direct line of sight and even through walls and around obstacles.

The receiver determines a mean value from several values corresponding to the monitored parameter and adjusts the range in accordance with the mean value. This allows automatically and adaptively an even more accurate optimization of the range to be achieved.

The transmitter sends out one or more further MEASURING transmitter signals in the seconds after sending out the UNLOCK transmitter signal, and the receiver monitors the relevant parameter, or the variation with time of the relevant parameter, of the received MEASURING transmitter signals and correspondingly adjusts the range allocated to the UNLOCK transmitter signals. This allows the range to be optimized automatically and adaptively even more accurately.

The UNLOCK transmitter signals are radiated in coded form, for example, in accordance with an alternating code. The MEASURING transmitter signals are also sent out in coded form, namely the time intervals of the MEASURING transmitter signals and/or the pulse shape of the MEASURING transmitter signals correspond to ta fixed or alternating code allocated to the relevant transmitter. The receiver unlocks the relevant lock only as long as not only the received UNLOCK transmitter signal corresponds to its associated code but also the received MEASURING transmitter signals correspond to their associated code. This allows the security against unauthorized unlocking to be increased in that it is made even more difficult for strangers to be able to unlock the lock by recording the transmitter signals sent out by the transmitter and by later unauthorized sending out of these recorded transmitter signals.

The MEASURING transmitter signals, represent a series of short measuring pulses lasting several seconds. The transmitter contains a transmitter memory which induces the transmitter to send out the MEASURING transmitter signals within seconds after sending out the UNLOCK transmitter signal. The receiver is connected to a sensor which detects the opening of the opening or the touching or operating of a corresponding handle of the opening and then outputs a sensor signal. The receiver monitors the parameter of the relevant MEASURING transmitter signal or transmitter signals which are received by the receiver immediately before, during and/or immediately after the occurrence of the sensor signal, and correspondingly adjusts the range. This allows the range to be optimized automatically and adaptively with particular accuracy because the distance of the transmitter to the receiver is then defined rather accurately.

The receiver, after receiving an UNLOCK transmitter signal, initially does not unlock the relevant lock, but the receiver only unlocks the relevant lock if, immediately before, during and/or immediately after the occurrence of the sensor signal, the measured parameter of the relevant MEASURING transmitter signal then received is above the limit value which corresponds to a NOMINAL range in accordance with the measured parameter of this relevant MEASURING transmitter signal. This allows particularly high security against unintentional unlocking or unauthorized opening of the relevant lock or of the relevant covering of the opening to be offered. The receiver, after receiving an UNLOCK transmitter signal, which is too weak per se, first unlocks the relevant lock. The receiver relocks the relevant lock after a waiting period lasting a few seconds has elapsed if the parameter measured by it, of at least one of the MEASURING transmitter signals is by then not above the limit value which corresponds to a NOMINAL range valid therefor. These operations make it possible to open the relevant lock or the relevant covering of the opening even with a very weak battery of the transmitter but, nevertheless, allow high protection against unauthorized opening to be offered.

The receiver relocks the relevant lock after the waiting period has elapsed if it does not receive the sensor signal by then and additionally the parameter of the relevant MEASURING transmitter signal measured by it is above the limit value which corresponds to the NOMINAL range valid therefor. The receiver readjusts this NOMINAL range in accordance with the measured parameter of this current MEASURING transmitter signal then received, if it does not relock the relevant lock, but leaves it in the unlocked state past the waiting period. This allows, in addition, automatic readjustment of the range to be achieved.

In a closure system for a motor vehicle with an ignition key, the transmitter forms one constructional unit together with the ignition key. The transmitter sends out one or more MEASURING transmitter signals whilst the ignition key is inserted in the ignition lock, and the receiver monitors the relevant parameter or the variation with time of the relevant parameter of the received MEASURING transmitter signals and correspondingly adjusts the range allocated to the transmitter signals. This allows a further approach for automatic and adaptive—and indeed then particularly accurate—optimization of the range to be offered, where the transmitting powers of the relevant transmitter, that is to say the transmitter powers, can be particularly low during the surveillance.

The transmitter contains its own additional receiver and an adjusting unit for adjusting its own transmitting power, and the receiver contains its own additional transmitter which sends an adjusting signal to the additional receiver for adjusting the transmitting power of the transmitter. This allows the transmitter power for optimizing the range—exclusively or additionally to be adjusted, automatically and adaptively.

The transmitter adjusts its own transmitting power to the minimum transmitting power of the transmitter needed by the receiver by means of its adjusting unit and by means of the adjusting signal. This allows the minimum necessary transmitter power to be set automatically and adaptively, namely in a manner which is as protective as possible of the transmitter battery, and if necessary, automatically and adaptively simultaneously the sensitivity of the receiver to be adapted optimally to the transmitter power then given.

The receiver adjusts its own sensitivity for UNLOCK transmitter signals in such a manner that although it can distinctly receive the UNLOCK transmitter signals when the transmitter is outside the range adjusted for the UNLOCK transmitter signals it then still does not initiate the unlocking, and that it initiates the unlocking after the reception of one or more UNLOCK transmitter signals when the transmitter is within the range adjusted for UNLOCK transmitter signals. This allows the most accurate optimization of the range possible without great expenditure for the receiver to be achieved automatically and adaptively, and if necessary, even allow the recording of whether transmitter signals have been received which were too weak to trigger the operation of the locking elements.

The receiver adjusts its own sensitivity to LOCK transmitter signals in such a manner that it locks the relevant lock even when the transmitter is outside the adjusted range for UNLOCK transmitter signals if the receiver receives one or more LOCK transmitter signals from the transmitter. This allows the protection against unintentional unlocking to be increased, in that two different sensitivities of the receiver have the result that the maximum range for LOCK transmitter signals is greater than the maximum range for UNLOCK transmitter signals, as a result of which the user can still lock the relevant lock from a distance from which he could no longer unlock this lock.

The transmitter radiates its UNLOCK transmitter signals with distinctly lower power than its LOCK transmitter signals. This allows the protection against unintentional unlocking—mainly also against unintentional retention of the UNLOCKED state of the vehicle to be increased, in an even different manner, in that two different transmitter powers have the result that the maximum range for LOCK transmitter signals is greater than the maximum range for UNLOCK transmitter signals, as a result of which the user can still lock the relevant lock from a distance from which he could no longer unlock this lock, this further development being particularly advantageous if it also corresponds to embodiments wherein the receiver adjusts its own sensitivity.

Several transmitters with mutually differently coded transmitter signals and with mutually different transmitting power are used in the closure system. In this embodiment the receiver has a receiver memory, and the receiver adjusts its own sensitivity differently from transmitter to transmitter during or after reception of a coded transmitter signal which contains a key code identifying the respective transmitter. The receiver stores in the receiver memory the different optimum NOMINAL values of the sensitivities which are in each case allocated to the individual transmitters. The receiver adjust its own sensitivity in each case in accordance with the NOMINAL value allocated to the relevant transmitter during or after reception of a coded transmitter signal which contains a key code identifying the respective transmitter. This allows the ranges of several different transmitters in each case individually adapted to each transmitter to be optimized automatically and adaptively, this further development being particularly advantageous if it also corresponds to embodiments wherein the transmitter has an additional receiver and the receiver has an additional transmitter, and furthermore wherein the receiver adjusts its own sensitivity and the transmitter adjusts its own transmitter power.

BRIEF DESCRIPTION OF THE DRAWINGS

The invention and further developments thereof are explained in greater detail with reference to an illustrative embodiment of the invention shown in the two figures, which is shown by the simplest possible arrangements for the sake of clarity and represents a motor vehicle closure system. In this system.

DESCRIPTION OF THE PREFERRED EMBODIMENT

Figure 1:
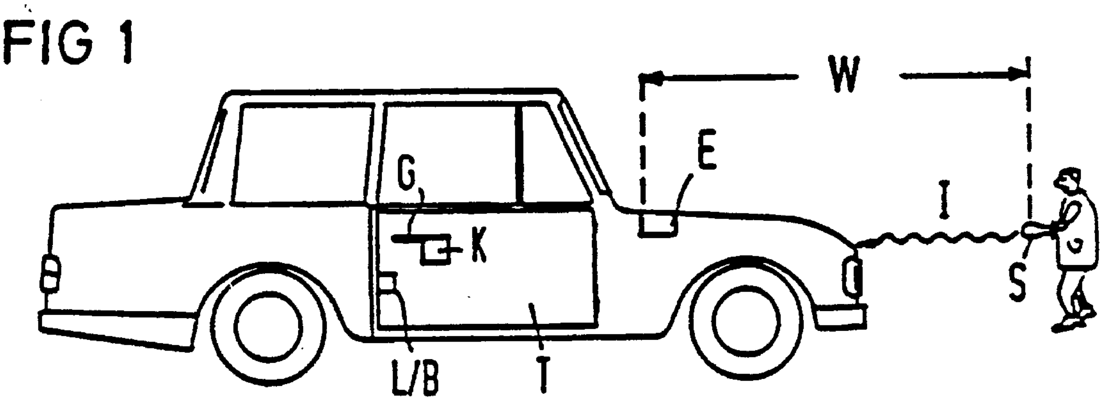
FIG. 1 shows an example of the spatial distribution of components of this motor vehicle closure system without including the various lines between these components.

Thus, both figures show a motor vehicle closure system according to the invention, which can be remotely controlled by transmitter signals I, and which is, for example, a central locking system for several locks L of several coverings T of the openings.

The user operates a portable transmitter S, shown in both figures, which is used as key S. The transmitter S transmits, for example triggered by operation of a corresponding push button of the transmitter S, its transmitter signals I to the receiver E mounted in the motor vehicle. The transmitter signals I can be, for example, UNLOCK transmitter signals I which, by means of the control signal Z, initiate the unlocking of the relevant lock or of the relevant locks L, and/or LOCK transmitter signals I which, by means of the control signal Z, initiate the locking of these locks L,—but in each case only if the receiver E is within the range W of the transmitter S. The transmitter signals I then trigger a control signal Z, only shown in FIG. 2, via the input stage A of the receiver E and via the output stage R of this receiver E. This output stage R can be, for example, a relay R, or a different type of control circuit R supplying sufficient current intensities, which, by means of the control signal Z, controls the locking element B, where this locking element B can be, for example, a bolt B which can be moved by solenoid coils and locks the lock L.

Thus, the receiver E, induced by the transmitter signals I, controls the locking element B of at least one lock L of at least one covering T, for example the locking element B of the lock L of the driver door D of the motor vehicle, preferably only after checking the access authorization of the user of the transmitter S, namely, for example after comparing the code received from the receiver E with corresponding digits previously stored in the receiver memory M. For the sake of clarity, both figures only show a single lock L, the locking element B of which is operated by means of the transmitter signals I. In this arrangement, the user can remotely control the locking elements B by means of a transmitter signal I or by means of a more or less precisely prescribed series of transmitter signals I, only "the transmitter signals I" being in each case mentioned here, however, for the sake of simplicity.

For this purpose, this receiver E can exhibit at least two states, namely a first state in which it leaves the relevant lock L in the locked state and in which, if necessary, it also locks the previously unlocked lock L, and a second state in which, induced by the transmitter signal I, it allows the relevant covering T to be opened by an appropriate operation of the locking system.

In every such motor vehicle closure system which can be remotely controlled by a transmitter S, there is the basic risk that the user of the motor vehicle is moving away from the motor vehicle, believing that he has closed and locked the motor vehicle whereas the transmitter S is still within its maximum range W and the user accidentally again induces the transmitter S to radiate its transmitter signals I. The lock L can be unintentionally unlocked again even when the user, after leaving and correctly locking the motor vehicle, put the transmitter S into his pocket—for example even into his briefcase—but in doing so accidentally again triggered the transmission of the transmitter signals I—especially if these are radio transmitter signals I, because radio waves, due to their characteristic of propagation, in contrast to infrared signals, can also easily penetrate walls and thus also a pocket of the user and therefore the transmitter signals I can also be accidentally triggered when the transmitter S has already been pocketed, even from outside a house and around corners.

This user frequently does not even notice he has again accidentally remotely controlled the unlocking, for example because he leaned against something and, in doing so, accidentally pressed a relevant push button of the transmitter S whilst the transmitter S accidentally was still within range W of the receiver E—or, for example, by means of other objects which accidentally push onto the push button or onto the trigger of the transmitter S in the pocket of the user. Unauthorized persons, for example children, can also play with the transmitter S and even unintentionally unlock the relevant locks L from a distance.

In addition, the range W of the transmitter S per se can also be subject to temporary fluctuations which occur in the course of the operation of the transmitter S. These fluctuations in the range W are based on, for example, different outside conditions such as temperature, or on a decrease in the battery voltage in the transmitter S.

A further difficult point per se are the tolerances of the components in the manufacture of the closure system, or the spread in transmitter power and in receiving sensitivity of the receiver E caused by these tolerances.

For these reasons, a maximum range W—or a corresponding maximum transmitter power and a corresponding maximum receiving sensitivity—should be set as reliably as possible between the transmitter S and the receiver E which allows the motor vehicle to be reliably opened and closed only within a narrowly definable distance W from the motor vehicle of, for example, 10 m+/−2 m.

If, in addition, the transmitter power of the transmitter S is already dimensioned during the production to be so low that the range W remains sufficiently short, a reduction in the range W must be expected as the battery of the transmitter S becomes weaker, which runs counter to the user's desire for comfort. If, however, the transmitter power is adjusted to be correspondingly higher when it is manufactured, the range W of this transmitter S is too wide with a new battery which entails the risk that the user can accidentally operate the transmitter S again within this wide range W.

The invention therefore relates to the problem of avoiding, automatically and adaptively unwanted ranges W, namely excessive ranges W and inferior ranges W, and ranges W which change with time—possibly even greatly, of thus automatically and adaptively adjusting the range W between the transmitter S and the receiver E, if possible independently of tolerances, temperatures and ageing effects of the components of the closure system and if possible independently of the state of charge of any battery mounted in the transmitter S and if possible independently of the respective climate.

The automatic and adaptive adjustment of the range W should also be achieved without bothering the user of the key S, especially without making it more difficult for him to operate the closure system, with little expenditure for the transmitter S and for the receiver E.

The receiver E constructed in accordance with the invention correspondingly automatically and adaptively adjusts the sensitivity of the receiver E and/or the transmitter power. This is because the invention utilizes the finding that the range W of the transmitter S can always be adjusted back to its optimum NOMINAL value if the transmitter power and/or the sensitivity of the receiver E is automatically and adaptively adjusted in accordance with more or less regular direct or indirect measurements of the respective maximum range W in more or less regularly recurring time intervals.

This is why the receiver E constructed in accordance with the invention monitors—at least from time to time, for example directly during each operation of the locking system of the relevant lock L—a physical parameter of the received transmitter signals I, for example their power or their field strength. For this purpose, the receiver E, compare FIG. 2, exhibits, for example in addition to its input stage A or, for example, within this input stage A, the unit V which can also be called device V for monitoring this parameter—that is to say, for example, for monitoring the received field strength of the transmitter signals I, and device V for adjusting the maximum range W, that is to say for adjusting the sensitivity of the receiver E.

According to the invention, a physical parameter dependent directly or indirectly on the range W, for example the transmitter power, of the transmitter S is thus measured more or less regularly, and in dependence thereon, the sensitivity of the receiver E and/or the transmitter power is adjusted in such a manner that a well definable receiving range is obtained as maximum range W.

This unit V of the receiver E thus measures, at least indirectly, this parameter and regulates, for example, the sensitivity of the input stage A by means of a corresponding feedback indicated in FIG. 2—perhaps even without additionally also influencing the transmitter power—for example in the manner described below. Even if this unit V only adjusts the receiving sensitivity of the receiver E but not additionally the transmitter power, the range W is optimally adapted in the next operation of the transmitter S, that is to say in the next remote control operation—even to the respective state of charge of the battery of the transmitter S and even to any tolerances and ageing phenomena of all components of the transmitter S and of the receiver E.

Thus, the range W is readjusted, at least from time to time if not continuously with each operation of the transmitter S, for the next operations of the transmitter, by means of the adaptive adjustment according to the invention. The range W is thus sufficiently large for enabling a user of the closure system to unlock Z the motor vehicle even when he is moving towards his motor vehicle. On the other hand, however, the receiving range is sufficiently delimited to ensure that the user no longer unintentionally operates the locking system of his motor vehicle by an accidental operation of the transmitter S taking place far away from the motor vehicle.

This makes it possible to cover even fluctuations in the climate and incidentally also any disturbances in the operation due to ranges W which have previously been too short,—especially if the receiver E contains a memory M in which the various values of the relevant parameter of the transmitter signals I, measured in each case, are stored over the period of a relatively large number of unlocking operations—for example over weeks and months, from which values this unit V, which can also contain a computer, for example, derives the maximum permissible range W by corresponding comparisons of the stored values and accordingly adjusts the input stage A. A rather accurate, automatic and adaptive optimization of the range W is made possible, for example due to the fact that the receiver E—for example by means of temporary storages in its receiver memory M of several values of the parameter determined by its unit V—determines a mean value from several values corresponding to the monitored parameter and adjusts the range W in accordance with the mean value. The receiver E can then adjust, for example the sensitivity of its input stage A, in accordance with the mean value found. Further measures for adjusting the sensitivity of the receiver E and/or the transmitting power of the transmitter S will be explained later.

The monitoring of this parameter according to the invention and the corresponding adjustment of the range W according to the invention can thus have the result that not only the manufacturing tolerances, charging states and climatic influences, but also ageing effects of the components of the closure system, are automatically and adaptively eliminated.

The advantages according to the invention can also be achieved if transmitter signals I are used which allow the locking per se to be controlled not only with a direct line of sight between the transmitter S and the receiver E but mainly also without a direct line of sight and even through walls and around obstacles, that is to say when the transmitter signals I are transmitted by radio, that is to say have radio frequencies.

The range W can be optimized even more accurately, automatically and adaptively, in that the transmitter S does not monitor—or does not monitor only—the relevant parameter of the UNLOCK and/or LOCK transmitter signals I itself. The transmitter S can additionally send out—for example after sending out the UNLOCK transmitter signal—one or several further MEASURING transmitter signals I or measuring pulses I—for example successively several short measuring pulses I of a few msec duration at intervals of 500 msec, namely, for example, for the period of a total of 15 sec, the receiver E then monitoring—by itself or additionally—the relevant parameter—or the variation with time of the relevant parameter of the received MEASUREMENT transmitter signals I and the receiver E then correspondingly adjusts the range W—for example again by the receiver E correspondingly adjusting its own sensitivity.

To avoid unwanted excessive and inferior ranges W due to more or less regular, more or less continuous monitoring, the transmitter S can even send out the MEASURING transmitter signal I or the MEASURING transmitter signals I each time after the sending out of a transmitter signal I used for opening, when the unit V can in each case reoptimize the setting of the maximum range W.

To set the range W with a particularly high accuracy, the MEASURING transmitter signals I can form several measuring pulses I which are successively sent out by the transmitter S at particular intervals, where the parameter monitored by the unit V represents, for example, the variation of power or field strength immediately before, during and/or immediately after the opening of the covering T and where this unit V subsequently accordingly adjusts the sensitivity of the receiver E.

The MEASURING transmitter signals I per se can also represent simple pulses which are sent out, for example, at constant intervals. However, the protection against unauthorized unlocking can be increased, in that it is made even more difficult for strangers to be able to unlock the lock by recording the transmitter signals sent out by the transmitter and by later unauthorized sending out of these recorded transmitter signals: a closure system, the UNLOCK transmitter signals I of which are radiated in coded form—preferably in accordance with an alternating code, is particularly suitable for this purpose, in which arrangement, however, the MEASURING transmitter signals I are also sent out in coded form. For this purpose, the time intervals between the MEASURING transmitter signals I and/or the pulse shape of the MEASURING transmitter signals I should in each case correspond to a fixed—or also alternating—code allocated to the relevant transmitter S. In this variant of the invention, the receiver E only unlocks the relevant lock L as long as not only the received UNLOCK transmitter signal I corresponds to its associated code but also the received MEASURING transmitter signals I correspond to their associated code. This variant of the invention allows further conditions to be set for the unlocking, for example the condition, described in detail below, that at least one single pulse of the received MEASURING transmitter signal I must exhibit a minimum field strength—otherwise the receiver E will not unlock the relevant lock L.

To readjust or to reset the range W more or less regularly, the transmitter S can also contain a transmitter memory N. This transmitter memory N induces the transmitter S to send out one, or at intervals successively several, MEASURING transmitter signals I in the seconds after sending out a transmitter signal I used for opening. The transmitter memory N can be formed, for example, by a counter or timer or clock, and this transmitter memory N can then induce the transmitter S to send out a series of short MEASURING transmitter signals I within the seconds after sending out the UNLOCK transmitter signal I—for example within 20 seconds. But the receiver then does not need to evaluate all MEASURING transmitter signals I sent out:

In the example of the invention shown, the receiver E is connected to a sensor K which is mounted, for example, in the door handle G and responds to contact by the user and which by this means detects the opening of the covering T or the operation of the door handle G of the covering T. This measure allows the powers of the MEASURING transmitter signals I, which it receives immediately before, during and/or immediately after the final opening of the covering T or immediately before, during and/or immediately after the operation of the door handle G, to be monitored with particular accuracy:

This is because the range W can be automatically and adaptively optimized with particular accuracy if the distance of the transmitter S from the receiver E is defined rather accurately by means of the sensor K during the MEASURING transmitter signals I, and especially if additionally the MEASURING transmitter signals I overall represent a series of short measuring pulses I lasting several seconds—during which process the transmitter powers can be especially low during this monitoring because the distance of the transmitter S from the door handle G or from the receiver E is then particularly short:

If the receiver E then additionally exhibits the sensor K which detects the opening of the covering T or the contact or operation of a corresponding handle G of the covering T and then outputs a sensor signal C, the receiver E can also evaluate this parameter by itself during this relevant—or during these few relevant—MEASURING transmitter signals I which are received by the receiver E immediately before, during and/or immediately after the occurrence of the sensor signal C;—the receiver E can then correspondingly adjust not only a "second" range W(2) which corresponds to the maximum distance of the transmitter S from the receiver E—being for example 1 m—during the occurrence of the sensor signal C, but can also adjust that first range W which is comparatively much greater—for example 10 m, from which the receiver is ready provisionally to acknowledge an UNLOCK transmitter signal I as such.

In principle, various types of sensors K can be used for this: it can be for example, a sensor K which represents a contact sensor K mounted in the door handle G and touched by the user during the opening, or which represents an additional antenna K largely responding only in the near field of the transmitter S.

Thus, the receiver memory M does not need to evaluate that parameter of all received MEASURING transmitter signals I but only the parameter of, at the most, those few relevant MEASURING transmitter signals I which it receives approximately during the occurrence of the sensor signal C.

Figure 2:
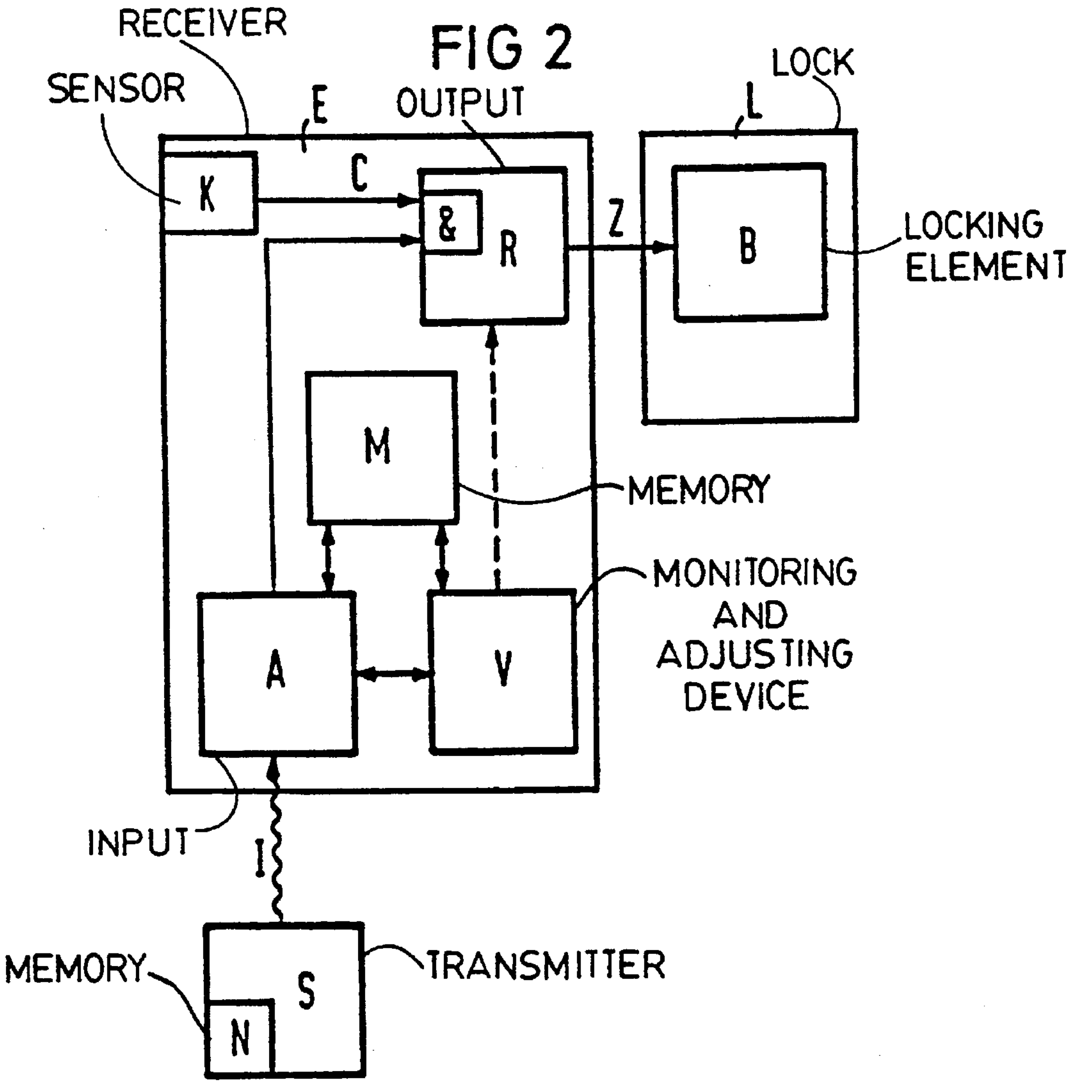
FIG. 2 shows a block diagram of these components.

The receiver E can even be of such a construction, for example the AND gate & in the output stage R of the receiver E in FIG. 2, that the control signal Z for unlocking the lock L is only output when in each case both the sensor signal C and—more or less—simultaneously the MEASURING transmitter signal I acts on the output stage R via the input stage A. The relevant parameter of the MEASURING transmitter signal I occurring during the sensor signal C then induces the unit V to adjust the range W in advance for the next remote control of the closure system.

To offer particularly high protection against unintentional unlocking or unauthorized opening of the relevant lock or the relevant covering T, it can thus be additionally provided that the receiver E does not yet unlock the lock L immediately after the reception of the UNLOCK transmitter signal I but only unlocks the lock L after the reception of UNLOCK transmitter signals I when the measurement of the relevant parameter (for example field strength) of the additionally transmitted MEASURING transmitter signals I has shown that the currently received UNLOCK transmitter signal I, referred to the currently correct NOMINAL value of the adjustment of the maximum range W, apparently must have been sent out within this correct maximum range W; otherwise, the relevant lock L remains locked. In this connection, the receiver E can also be constructed or dimensioned in such a manner that, after receiving an UNLOCK transmitter signal I, it only unlocks the lock L if at least one single one of the measuring pulses I currently additionally received has a greater field strength than corresponds to the value for the maximum range W stored earlier—perhaps even days or months ago.

To enable the relevant lock or the relevant covering of the opening to be opened even with a very weak battery of the transmitter but, nevertheless, to offer high protection against unauthorized opening, the receiver E can also be differently constructed or dimensioned: for this purpose, it can unlock the relevant lock L after the reception of an UNLOCK transmitter signal I even if this UNLOCK transmitter signal I has a parameter which is still much too small per se, initially for a waiting period lasting a few seconds—for example for 20 seconds. But then the receiver E immediately relocks the relevant lock L, that is to say after this waiting period has elapsed, if the parameter, measured by it, of at least one of the MEASURING transmitter signals I is not by then above the limit value which corresponds to a NOMINAL range W valid therefor until then. Although the relevant lock L is initially immediately temporarily unlocked, it is rapidly locked again if not at least one single one of the measuring pulses I currently additionally received has a parameter (for example field strength) which is greater than corresponds to the NOMINAL value stored for it earlier—perhaps even days or month ago. Compare European Patent Application 91 103 518.6, not previously published.

To achieve an additional rapid automatic readjustment of the range in the last-mentioned case, the receiver E can also contain the sensor K and relock the relevant lock L only after the waiting period has elapsed if the sensor signal C does not by then occur in the receiver E and if additionally the parameter, measured by it, of at least one single one of the currently received relevant MEASURING transmitter signals I is not by then above the limit value which corresponds to the first or second NOMINAL range W valid therefor. If the measured parameter is above the limit value, that is to say if the receiver E does not relock the relevant lock L but leaves it in the unlocked state past the waiting period, the receiver E can also readjust the range W.

The invention allows a further approach to an especially accurate automatic and adaptive—and indeed then especially accurate—optimization of the—then again "second"—range W by means of precise definition of the distance of the transmitter S from the receiver E during the transmission of MEASURING transmitter signals I when the transmitter powers can even be particularly low during the monitoring: for this purpose, the transmitter S can form one constructional unit S together with the ignition key, the transmitter S sending out one or more MEASURING transmitter signals I at the precise moment when the ignition key S is inserted in the ignition lock. The receiver E monitors the relevant parameter or the variation with time of the relevant parameter, of the MEASURING transmitter signals I received from the inserted ignition key and accordingly adjusts the "first" and possibly also "second"—in accordance with the definition given above—range W allocated to the UNLOCK transmitter signals I and/or LOCK transmitter signals I. The receiver E and the transmitter S can also be designed in such a manner that (only) whenever the ignition key has been inserted into the ignition lock, the receiver E induces the transmitter S temporarily to send out the MEASURING transmitter signals I in order to adjust the relevant range(s) accordingly thereafter.

To optimize the range W, the transmitter power of the relevant transmitter S can also be set—exclusively or additionally—automatically and adaptively by the transmitter S containing its own—not shown in the figures for the sake of clarity—additional receiver and an adjusting unit for adjusting its own transmitter power, the receiver E also containing its own additional transmitter which transmits an adjusting signal to the additional receiver of the relevant transmitter S for adjusting the transmitter power. A transmitter which, as described above, can be used at the same time as the ignition key is particularly suitable for this purpose. Thus, the unit V, after monitoring the parameter, can supply a setting signal to the transmitter S which adjusts the transmitter power for establishing the maximum range W, especially in order to avoid unwanted excessive ranges W of the transmitter S which make it easier for strangers also to receive and to store the radiated code or the radiated transmitter signal, respectively, in order to use such stored data later for an intrusion, which is prohibited.

Furthermore, the minimum transmitter power necessary in the transmitter battery can be automatically and adaptively set in the most careful manner possible by, if necessary, not only adapting the transmitter power by means of the additional receiver but also optimally adapting at the same time automatically and adaptively the sensitivity of the receiver E to the transmitter power then given. For this purpose, the transmitter S can adjust its own transmitter power by means of its adjusting unit and by means of the adjusting signal to the minimum transmitter power needed by the receiver E.

A particularly accurate automatic and adaptive optimization of the range W can also be achieved, without great complexity in the receiver E, by the fact that the receiver E adjusts its own sensitivity for UNLOCK transmitter signals in such a manner that it can clearly receive the UNLOCK transmitter signals I when the transmitter S is outside the range W adjusted for the UNLOCK transmitter signals I but then still does not initiate the unlocking by means of the signals Z, and that it E initiates the unlocking by means of the signals Z after receiving one or more UNLOCK transmitter signals I when the transmitter S is within the range W adjusted for the UNLOCK transmitter signals I.

If necessary, the receiver E can then even record—for example in its receiver memory M—that it has in fact received transmitter signals I but that these were graded as too weak for it to operate the locking element B.

The protection against unintentional unlocking can be further enhanced by means of two different sensitivities of the receiver E. For this purpose, the receiver E can be designed in such a manner that it additionally adjusts its own sensitivity of LOCK transmitter signals I, in such a manner that it still locks the relevant lock L even when the transmitter S is outside the adjusted range W for UNLOCK transmitter signals I if the receiver E receives one or more LOCK transmitter signals I from the transmitter S.

By making the maximum range for LOCK transmitter signals I greater than the maximum range for UNLOCK transmitter signals I, the user can still lock the relevant lock from a distance from which he could no longer unlock this lock.

In a variant of the invention, the transmitter S radiates its UNLOCK transmitter signals I with a distinctly lower power than its LOCK transmitter signals I. This further increases the security against unintentional unlocking—especially also against unintentional retention of the UNLOCKED state of the vehicle, in that the two different transmitter powers have the result that the maximum (first) range W for LOCK transmitter signals is greater than the maximum (first) range W for UNLOCK transmitter signals. As a result, the user can still lock the relevant lock from a distance from which he could no longer unlock this lock.

In a motor vehicle closure system which comprises not only one single transmitter S but several transmitters S, the individual transmitters S can initially in each case have different transmitter powers and thus different ranges W. To automatically and adaptively set the same range W for each of the individual transmitters S and as a result, to ensure reliable operation within the prescribed range of, for example, 10 m +/−2 m distance from the motor vehicle, a different sensitivity of the receiver E corresponding to the different transmitter power can be set for each transmitter S, for example in that different NOMINAL sensitivities are stored for the different transmitters S in the receiver memory M.

Thus, the ranges W also of several different transmitters S can be automatically and adaptively optimized in accordance with the invention by using in a motor vehicle closure system having several transmitters S with mutually differently coded transmitter signals I and with mutually different transmitter power, a receiver E which exhibits a receiver memory M and which adjusts its own sensitivity differently from transmitter S to transmitter S during or after reception of a coded transmitter signal I which contains a key code identifying the respective transmitter S. For this purpose, the receiver E can store in the receiver memory M those different optimum NOMINAL values of the sensitivities which are in each case allocated to the individual transmitters S.

In addition, the receiver E can adjust its own sensitivity differently in each case from transmitter S to transmitter S: thus, the receiver E can adjust its sensitivity—during or after reception of a coded transmitter signal I radiated by one of the various transmitters S, which signal contains a key code identifying the respective transmitter S in each case in accordance with the NOMINAL value in each case allocated to the relevant transmitter S and stored in the receiver memory M.

Although several individual constructional units are shown within the receiver E in FIG. 2, compare A, M, V and R, the receiver E can, however, also be an appropriately configured computer with a correspondingly programmed microprocessor which executes the relevant functions of at least some of these constructional units of the receiver E.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A closure system for a lock of a motor vehicle, said closure system being remotely controllable by transmitter signals, comprising:

at least one portable transmitter for emitting transmitter signals activating the lock;

a predetermined range around said motor vehicle within which said transmitter must be located for controlling the closure system, said predetermined range having an upper limit and a lower limit, a distance between said motor vehicle and said upper limit of said predetermined range being less than a distance over which the transmitter can physically transmit;

a receiver for receiving the emitted transmitter signals, the receiver triggering a control signal in response to receiving the emitted transmitter signals when the transmitter is located in said predetermined range;

a locking element which is controlled by the control signal and by means of which the lock is activated;

the receiver measuring a signal strength of the received transmitter signals, comparing a measured value of signal strength to a rated value stored in the receiver and setting a reception sensitivity of the receiver dependent on a result of the comparison of the measured value of signal strength to the rated value, the reception sensitivity being reduced when the measured value of signal strength exceeds the rated value such that the lock is activatable only when the transmitter is located within said predetermined range.

2. The closure system according to claim 1, wherein the transmitter signal has a first part containing activation information and a second signal part having measuring pulses whose amplitude is measured in the receiver.

3. The closure system according to claim 2, wherein the receiver has means for forming an average value from a plurality of measured amplitudes of the measuring pulses and stores the average value as the rated value.

4. The closure system according to claim 2, wherein the measuring pulses pend for a predetermined time, wherein the second signal part of the transmitter signal is a series of short measuring pulses lasting several seconds, wherein the transmitter has a transmitter memory via which the transmitter transmits the second signal part of the transmitter signal within seconds after a transmission of the first signal part of the transmitter signal for an unlocking of the lock, wherein the receiver is connected to a sensor that upon actuation outputs a sensor signal, and wherein the receiver measures a value of signal strength of the second signal part of the transmitter signal which the receiver receives, irrespective of when the sensor signal appears, and correspondingly compares the measured value of the signal strength of the second signal to the rated value.

5. The closure system according to claim 4, wherein after reception of a first signal part of the transmitter signal for an unlock that is too weak in and of itself, the receiver initially unlocks the lock and in turn locks the lock after expiration of a waiting time if the sensor signal does not occur by an end of the waiting time, and the measured value of the signal strength of the second signal part of the transmitter signal being above the rated value; and wherein the receiver corrects the rated value when the receiver does not lock the lock again but leaves the lock in an unlocked condition after the end of the waiting time.

6. The closure system according to claim 1, wherein the transmitter together with the ignition key form a structural unit;

wherein the transmitter transmits at least one second part of the transmitter signal while the ignition key is inserted in the ignition lock; and wherein the receiver measures a value of signal strength of the at least one second part of the transmitter signal and stores the measured value of signal strength of the at least one second part as the rated value.

7. The closure system according to claim 1, wherein the transmitter emits a first part of a transmitter signal for an unlocking of the lock with significantly lower power than a first part of a transmitter signal for a locking of the lock.

8. The closure system according to claim 1, wherein the closure system has a plurality of transmitters having transmitter signals coded differently from one another, wherein the receiver has a receiver memory wherein a separate rated value is stored for each transmitter, a respective separate rated value being utilized for comparing to a respective rated value dependent on a received key code that identifies the transmitter and being corrected as warranted dependent on a value of signal strength of the received transmitter signal.

9. A closure system for a lock of a motor vehicle, said closure system being remotely controllable with transmitter signals, comprising:

at least one portable transmitter for emitting transmitter signals for activating the lock;

a predetermined range around said motor vehicle within which said transmitter must be located for controlling the closure system, said predetermined range having an upper limit and a lower limit, a distance between said motor vehicle and said upper limit of said predetermined range being less than a distance over which the transmitter can physically transmit;

a receiver for receiving the emitted transmitter signals, and the receiver triggering a control signal in response to receiving the emitted transmitter signals when the transmitter is located within said predetermined range;

an auxiliary transmitter in the receiver and an auxiliary receiver in the portable transmitter; and a lock element which is controlled by the control signal and by means of which the lock is activated; and the receiver measuring a signal strength of the received transmitter signals, comparing a measured value of the signal strength to a rated value stored in the receiver and, dependent on a result of the comparison of the measured value of the signal strength to the stored rated value, transmitting a further signal via the auxiliary transmitter in the receiver to the auxiliary receiver in the portable transmitter, as a result whereof transmission power of the portable transmitter is modified dependent on the result of the comparison, the transmission power being reduced when the measured value of signal strength exceeds the rated value such that the lock is activatable only when the transmitter is located within said predetermined range.

10. The closure system according to claim 9, wherein the transmitter signal has a first part containing activation information and a second signal part having measuring pulses whose amplitude is measured in the receiver.

11. The closure system according to claim 9, wherein the receiver has means for forming an average value from a plurality of measured amplitudes of the measuring pulses and stores the average value as the rated value.

12. The closure system according to claim 10, wherein the measuring pulses pend for a predetermined time, wherein the second signal part of the transmitter signal is a series of short measuring pulses lasting several seconds, wherein the transmitter has a transmitter memory via which the transmitter transmits the second signal part of the transmitter signal within seconds after a transmission of the first signal part of the transmitter signal for an unlocking of the lock, wherein the receiver is connected to a sensor that upon actuation outputs a sensor signal, and wherein the receiver measures a value of signal strength of the second signal part of the transmitter signal which the receiver receives, irrespective of when the sensor signal appears, and correspondingly compares the measured value of the signal strength of the second signal to the rated value.

13. The closure system according to claim 12, wherein after reception of a first signal part of the transmitter signal for an unlock that is too weak in and of itself, the receiver initially unlocks the lock and in turn locks the lock after expiration of a waiting time if the sensor signal does not occur by an end of the waiting time, and the measured value of the signal strength of the second signal part of the transmitter signal being above the rated value; and wherein the receiver corrects the rated value when the receiver does not lock the lock again but leaves the lock in an unlocked condition after the end of the waiting time.

14. The closure system according to claim 9, wherein the transmitter together with the ignition key form a structural unit;

wherein the transmitter transmits at least one second part of the transmitter signal while the ignition key is inserted in the ignition lock; and wherein the receiver measures a value of signal strength of the at least one second part of the transmitter signal and stores the measured value of signal strength of the at least one second part as the rated value.

15. The closure system according to claim 9, wherein the transmitter emits a first part of a transmitter signal for an unlocking of the lock with significantly lower power than a first part of a transmitter signal for a locking of the lock.

16. The closure system according to claim 9, wherein the closure system has a plurality of transmitters having transmitter signals coded differently from one another, wherein the receiver has a receiver memory wherein a separate rated value is stored for each transmitter, a respective separate rated value being utilized for comparing to a respective rated value dependent on a received key code that identifies the transmitter and being corrected as warranted dependent on a value of signal strength of the received transmitter signal.

* * * * *